No. 729,992. PATENTED JUNE 2, 1903.
J. BAKER, Jr.
MEANS FOR LOADING OR DISCHARGING OIL.
APPLICATION FILED DEC. 8, 1902.
NO MODEL.
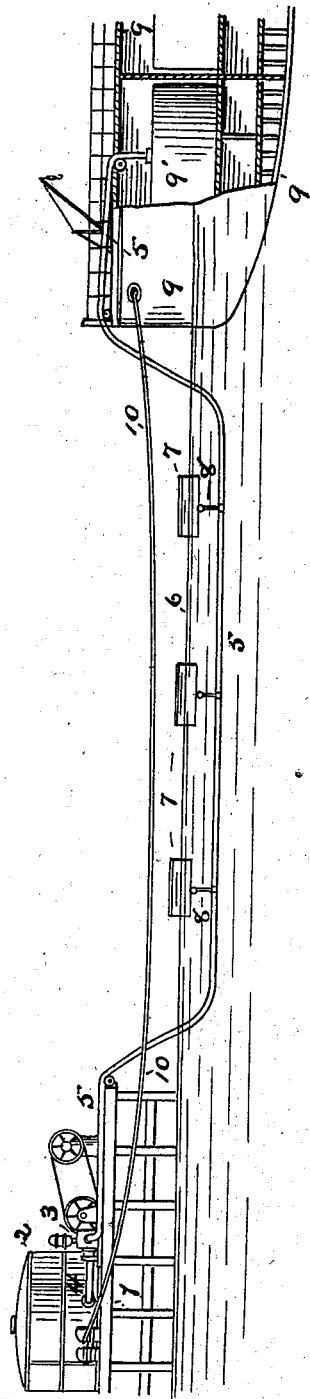
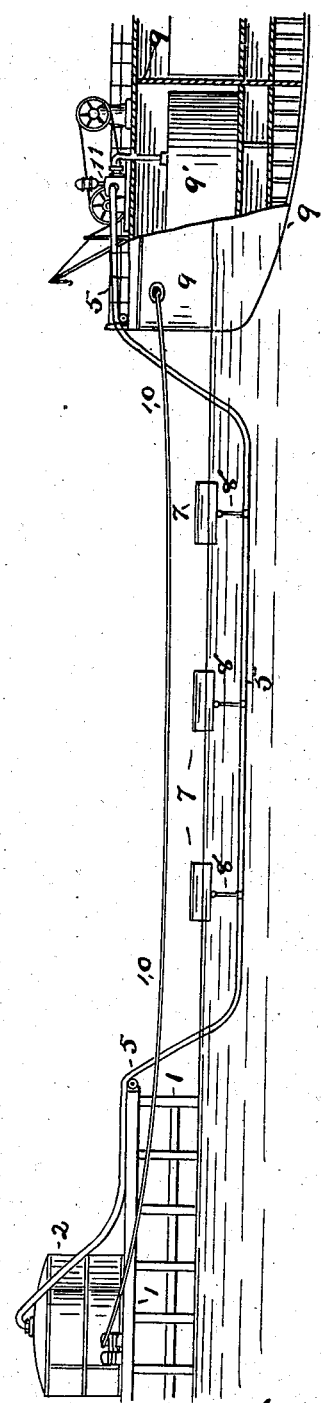
FIG. 1.
FIG. 2.
WITNESSES:
INVENTOR:
John Baker, Jr.

No. 729,992. Patented June 2, 1903.

UNITED STATES PATENT OFFICE.

JOHN BAKER, JR., OF SAN FRANCISCO, CALIFORNIA.

MEANS FOR LOADING OR DISCHARGING OIL.

SPECIFICATION forming part of Letters Patent No. 729,992, dated June 2, 1903.

Application filed December 8, 1902. Serial No. 134,335. (No model.)

*To all whom it may concern:*

Be it known that I, JOHN BAKER, Jr., a citizen of Great Britain, residing in the city and county of San Francisco, State of California, have invented certain new and useful Improvements in Means for Loading and Discharging Oil; and I do hereby declare the following to be a full, clear, and exact description of the same.

The present invention comprises means whereby a vessel may be loaded a distance from shore with oil or its cargo of oil may be discharged, the object being to enable the loading or discharging of the vessel to be successfully accomplished at such places where by reason of shallow water or dangerous coast the vessel cannot be brought alongside of the wharf in order to discharge its cargo or receive a cargo of oil.

To comprehend the invention reference should be had to the accompanying sheet of drawings, wherein—

Figure 1 is a view illustrating a vessel receiving its cargo of oil, the vessel being a distance from the wharf or shore; and Fig. 2 is a similar view illustrating the vessel as discharging its cargo of oil.

The numeral 1 is used to indicate a wharf, shore-line, or storage-depot for the oil, and 2 an oil or storage tank for the oil. In Fig. 1 a force-pump 3 is shown connected with the tank by connection 4, and to the pump is coupled one end of a flexible pipe-line 5. This pipe-line after leaving the oil-depot is suspended a distance below the surface of the water 6 by means of a series of floats 7, which floats are attached to the pipe-line by chains, short cables, or other flexible connections 8. The free end of the pipe-line extends onto the vessel 9 and leads to the receiving-tanks 9' in the hold thereof. By this means a pipe-line communication is established between the oil-depot and the vessel, the length of the pipe-line being an immaterial feature. It is essential that the pipe-line be held free of the ground, else the movement thereof caused by the change of tide or otherwise will cause the pipe-line to quickly wear out.

By suspending the pipe-line a distance below the surface of the water the same will be held in comparatively quiet water. Inasmuch as the connection between the floats and the pipe-line is a flexible one, the movement of the floats during rough weather or the water's waves will not materially disturb the position of the pipe-line.

To relieve the pipe-line of strain incident to the vessel's movement while riding at anchor, an anchor line, chain, or cable 10 is provided. This line is secured at one end to the wharf or shore 1 and its opposite end to the vessel 9. Said anchor-line is somewhat shorter than the pipe-line 5. Consequently all strain is taken by the anchor-line 10 from the pipe-line 5. By thus relieving the pipe-line of outward strain danger of the same being broken is removed.

In Fig. 2 of the drawings a suction-pump 11 is illustrated, located on the deck of the vessel; while the shore end of the pipe-line extends into the storage-tank 2. In this case the vessel is presumed to be discharging its cargo of oil.

Having thus described the invention, what is claimed as new, and desired to be protected by Letters Patent, is—

In combination with a fixed receiving or delivery depot, a floating vessel, an anchor-line connected at one end to said depot and at the other end to said vessel for retaining the vessel and depot within a predetermined distance apart, and transferring means between the vessel and the depot including a flexible pipe-line, floats flexibly connected to the pipe-line at separated points throughout its extent for preventing contact of said pipe-line with the water-bed, a tank on the vessel communicating with one end of the pipe-line, and a tank communicating with the depot end of the same, said pipe-line being of a length greater than the length of the anchor-line whereby the pipe-line is prevented from being drawn taut between the depot and the vessel.

In witness whereof I have hereunto set my hand.

JOHN BAKER, JR.

Witnesses:
N. A. ACKER,
D. B. RICHARDS.